United States Patent

[11] 3,603,788

[72] Inventors Floro D. Miraldi
2660 Edgehill Rd., Cleveland Heights, Ohio 44106;
Edward J. Morgan, 19713 Shakerwood Rd., Warrensville Heights, Ohio 44122
[21] Appl. No. 726,823
[22] Filed May 6, 1968
[45] Patented Sept. 7, 1971

[54] GAMMA RADIATION SOURCE AND METHOD FOR THE TREATMENT OF SEWAGE
14 Claims, 13 Drawing Figs.

[52] U.S. Cl. ................................................. 250/44,
210/64, 250/48, 250/106
[51] Int. Cl. ....................................................... G01n 21/26
[50] Field of Search............................................ 250/43, 44,
45, 48, 106, 106 S; 210/64

[56] References Cited
OTHER REFERENCES

Sewage and Industrial Wastes; Vol. 25; No. 11; Dunn; pgs. 1277–1281; November, 1953; 210-64

Journal Am. Water Works Association; Vol. 48; No. 11; Lowe et al.; Pgs. 1363–1372; November, 1956; 210-64

Primary Examiner—Archie R. Borchelt
Assistant Examiner—A. L. Birch
Attorney—Fay, Sharpe and Mulholland ABSTRACT: A method is disclosed for the treatment of contaminated water (sewage) by the gamma rays from fission byproduct waste so as to kill bacteria and/or degrade chemical waste in the contaminated water. The fission byproduct waste is encapsulated in a leach-resistant glass or ceramic product to form a radiation source. The radiation source is held by a holder inside a casing containing coolant. The source, holder, casing and coolant form a natural convection cell for the dissipation of heat. The casing with contents form radiation cells which may be interlocked into rows to form channels. The rows of cells may be fitted with guide vanes to give a generally helical motion and mixing of the contaminated water so as to ensure uniform irradiation of the water. The channels may be cleaned by high velocity water jets. As a result, a treatment plant may be designed and built so that sewage receives at least 0.14 megarads of radiation, which is sufficient to kill at least 99.99 percent of the Escherichia Coli bacteria degrade many chemical compounds, especially the benzyl sulfonate detergents, and accelerate sedimentation.

PATENTED SEP 7 1971

INVENTORS.
FLORO D. MIRALDI &
EDWARD J. MORGAN
BY
*Fay, Sharpe & Mulholland*
ATTORNEYS INVENTORS.
FLORO D. MIRALDI &
EDWARD J. MORGAN
BY
Fay, Sharpe & Mulholland
ATTORNEYS INVENTORS.
FLORO D. MIRALDI &
EDWARD J. MORGAN
BY
*Fay, Sharpe & Mulholland*
ATTORNEYS INVENTORS.
FLORO D. MIRALDI &
EDWARD J. MORGAN
BY
Fay, Sharpe & Mulholland
ATTORNEYS INVENTORS.
FLORO D. MIRALDI &
EDWARD J. MORGAN
BY
Fay, Sharpe & Mulholland
ATTORNEYS 3,603,788

GAMMA RADIATION SOURCE AND METHOD FOR THE TREATMENT OF SEWAGE

BACKGROUND OF THE INVENTION

In present practice, bacteria in sewage are normally killed by chlorination, but the system is expensive, the chlorine itself contaminates the water, and, as a result, the chlorination is often used in the hot part of the year. It is already known that gamma radiation can be used to treat sewage, but, until now, no economically feasible system has been proposed. The purpose of the present invention is to use the gamma radiation from fission byproduct waste to treat sewage in an economically feasible system.

Previous research has shown that E. Coli bacteria can be killed by radiation in the amount of 99.99 percent with a dosage of about 0.14 megarads. Radiation also degrades synthetic detergents and other compounds to whatever degree is desired.

In addition, we have found that various organic and inorganic materials that are suspended solid components in water, generally of colloidal proportion, may be coagulated. Some of these suspended solids consist of various organic matter which call for a biological oxygen demand for degradation. Frequently, these components will collect and settle and can be separated from the water, which is then returned to its source. By the use of radiation, we can increase the sedimentation of the suspended sold components because radiation can cause an agglomeration of the pollution particles which then become sufficiently enlarged to settle. It is also obvious that with a source of radiation no additional contaminants or materials need to be added to the effluent, and we thereby avoid one source problems.

In this invention, we use the gamma radiation from fission byproduct waste which is available in large quantities and is currently stored in the ground. bThese fission byproduct wastes are currently a financial burden on the United States Government since safe storage is expensive. It is considered that our particular use of fission product waste would take a large fraction of this kind of material and relieve a part of the storage burden. At the present time in the state of the art, some of the fission product waste has been handled by encapsulating in one form or another, and by mixing the wastes with chemicals to form a ceramic or glasslike product and, thus, a material impregnated throughout with a large amount of waste. This impregnation technique per se is described in Watson, L. C. et al., "The Disposal of Fission Products in Glass," Second United Nations Conference on Peaceful Uses of Atomic Energy, Geneva, Switzerland, 1958, Volume 18, page 19.

This invention describes an economically feasible sewage treatment system in which is used fission byproduct wastes which have been encapsulated in a leach-resistant glass or ceramic product.

SUMMARY OF THE INVENTION

An object of this invention is to provide a system for the treatment of sewage and for treating large quantities of water with a radiation source by moving one with respect to another.

Another object of this invention is to provide a design of a sewage treatment system using fission product waste as a radiation source so that large quantities of sewage may be treated economically with radiation.

A further object of this invention is to provide a type of radiation cell that may be used in great numbers for treatment of sewage, with the cell encompassing an encapsulated or impregnated source of high-energy electromagnetic radiation, a suitable holder therefor and a coolant surrounding the radiation source, all contained in a casing so that the flow of sewage is not in direct contact with the radiation source but is insulated therefrom by the casing and the coolant layer.

In the treatment of sewage containing human fecal matter, we propose to treat said sewage to kill a high percentage (of the order 99.99 percent) of the Escherichia Coli bacteria by exposing the sewage to a source of electromagnetic radiation from fission product waste products. The major portion of the activity is due to the isotopes strontium-yttrium, cesium-barium and promethium, which may account for as much as 87 percent of the total activity. Since the range of beta rays in material is very small, irradiation of the sewage would be primarily accomplished by the gammas emitted by barium 137, which is the daughter of cesium and accounts for 14 percent of the total activity. These fission waste products are impregnated in a solid such as nepheline syenite glass or other ceramic and put in the form of a brick, rod, ball, bead or other shape. The source is placed in an appropriate casing with coolant forming a convection cell which will permit efficient cooling and separate the source from the stream of sewage passing on the outside of the convection cell. The radiation source and cell may be employed in substantial numbers to expose the sewage to the radiation so that a lethal dose of radiation treats substantially all (greater than 99 percent) of the Escherichia Coli bacteria and degrades 100 percent of the benzyl sulfonate synthetic detergents.

Currently the sewage treatment practice calls for a measurement of the Escherichia Coli, commonly known as E. Coli, which is used as the reference standard for sewage purification. The E. Coli are abundantly present in human fecal matter and tend to be one of the more resistant to treatment. The table below presents the radiation sensitivity of E. Coli. Present sewage treatment practice with chlorine results in a bacteria removal of greater than 99 percent. We treat the sewage in the manner described in this application to remove 99.99 percent of the bacteria at a treatment of 0.14 megarads.

RADIATION SENSITIVITY OF E. COLI

| Gamma Radiation Dose Megarads | Percent of E. Coli Killed |
| --- | --- |
| 0.026 | 99.00 |
| 0.066 | 99.80 |
| 0.139 | 99.99 |
| 0.199 | 100.00 |

In general, a sewage plant using fission byproduct waste for treatment is designed in the manner of conventional plants; for example, a sewage is first directed into a settling basin and preliminary treatment is given; then, instead of ding sewage into a chlorination section, as is presently done, the sewage goes through the radiation section. The radiation section is formed by putting together a series of cells described below, and the total number and size of the cells are dependent upon the extent and type of pollution of the input and the degree of sterilization and chemical breakdown desired. At the present time, chlorination is provided for only a few months of the year in some locations, whereas radiation could be provided all year around just as conveniently and at no additional cost.

Figure 1:
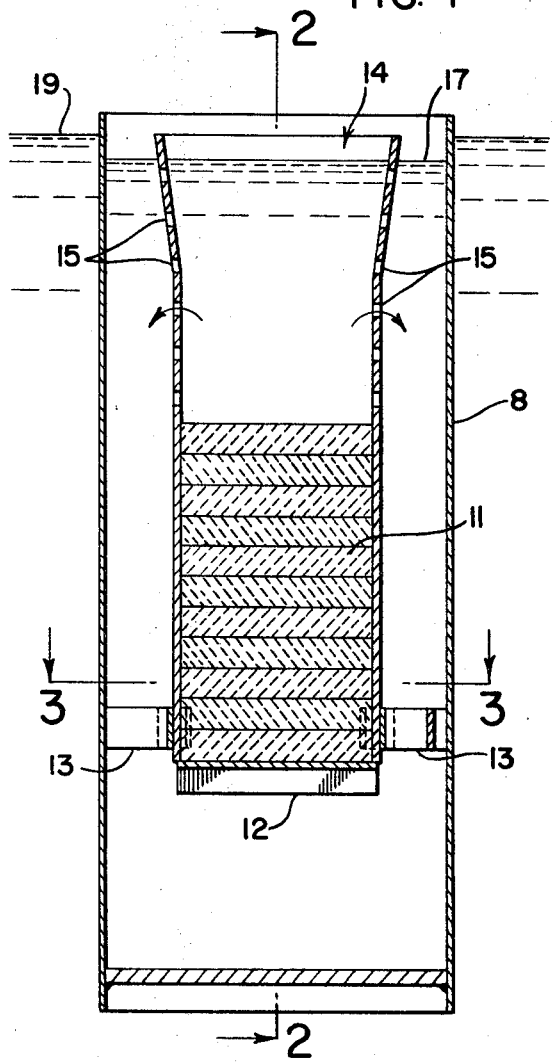
FIG. 1 is a vertical elevational view of a radiation cell consisting of the source, the source holders, and the outer casing therefor.

FIG. 1 shows an elevational view of radiation cell which has a source of radiation 11 comprised of a series of leach-resistant fission-byproduct-impregnated bricks in this instance. The bricks are held in a source holder 14 having a number of openings 15 for passage of coolant through the holder. The bottom of the source holder has a base plate 12 to support the bricks, and there are bottom guides 13 to locate the source holder with respect to the outer casing 8. The outer casing could be made from a wide variety of metals or plastics. The level of the water in the radiation cell is shown at 17 and is generally below the level of the sewage when the cells are in position or irradiating the sewage. Since the pressure difference across the outer casing is very small, strength of the casing material is not a difficult problem as occurs with cladding of nuclear fuels.

Figure 2:
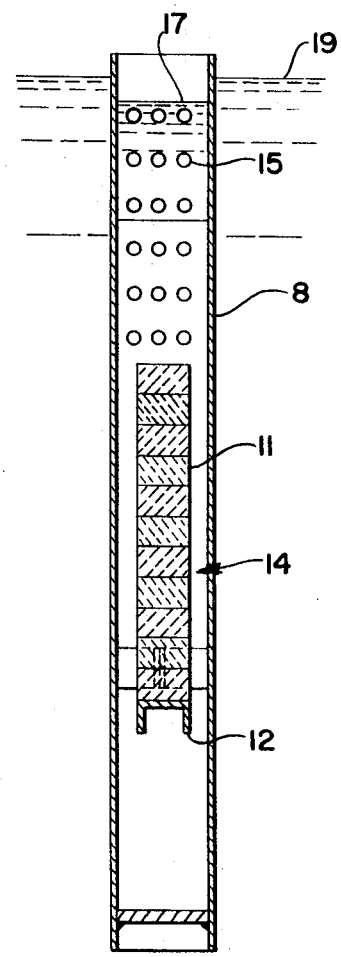
FIG. 2 is a vertical cross-sectional view of FIG. 1.

FIG. 2 shows a cross-sectional view of the cell of FIG. 1. Here the source elements 11 are shown surrounded by the coolant 19 (preferably water), and there are an adequate number of water openings 15 in the holder 14 to permit the free flow of water on all sides of the source holder to cool the source. Note that the vertical ends of the holder 14 separate the up flow (being heated by the source 11) from the down flow (being cooled by the outside sewage), thus forming a very efficient convection cell (see also FIG. 3). The coolant flow direction is indicated by the arrows.

Figure 3:
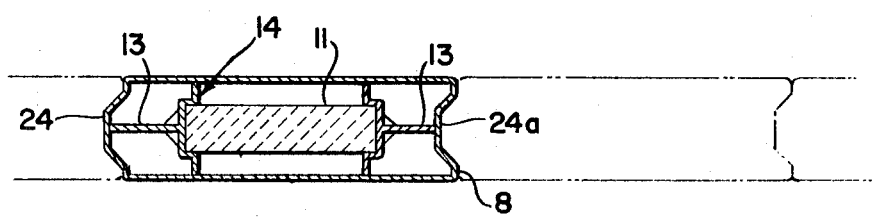
FIG. 3 is a horizontal cross-sectional view along the lines 3—3 of FIG. 1.

FIG. 3 shows a top plan view of the radiation cell with the source and the outer casing. It will be noted that the source 11 is surrounded on all sides by outer casing 18, and there are bottom guides for the source as shown at 13. The casing is generally of interlocking design with complementary interlocking grooves shown at 24 and 24a so that a number of cells may be easily used in combination. However, individual cells may be removed and replaced at any time without moving the remaining cells. Across the top of each cell is a cap to prevent contamination of the cell contents. These caps ate not shown in the figures.

Figure 4:
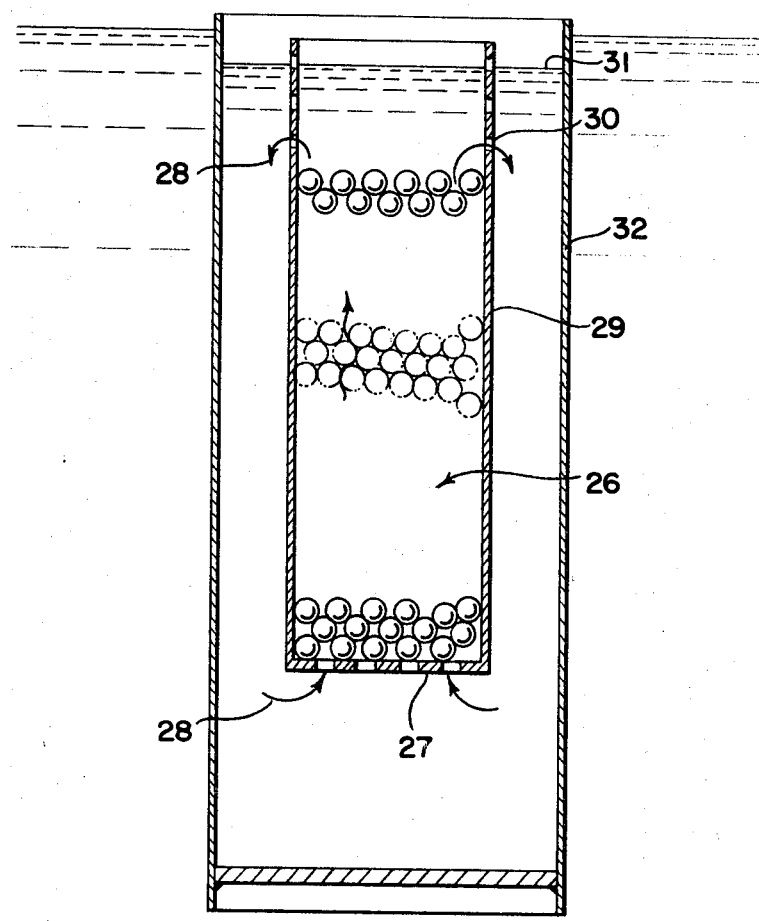
FIG. 4 is a sectional view of a radiation cell using pebble or ball-shaped radiation elements.

FIG. 4 shows an alternate embodiment of the cell 32 wherein the leach-resistant fission-product-impregnated source is in the form of beads, balls or pebbles arranged in the nature of a packed column. In this instance, we show the source at 26, a perforated base plate at 27 to support the beads or pebbles, and the cooling liquid flow path at 28, which is upwardly through the material, outwardly through openings 30, and downwardly between the outer casing and the ends of the source holder 29. The source holder 29 may have mesh, perforated or similar sides, or there may be no sides at all, but the holder ends should extend from one side of the casing to the other so as to separate the up and down flows. The level of the coolant, preferably water, is shown at 31. Other details in the source holder in this design are comparable with, and reference is made to, FIG. 1 to 3 for details not shown in this figure.

While the design of the source and the source holder are important, one has a great amount of freedom in that the glasslike material may be manufactured in any preferred shape or size. Of particular interest is a design using a source in the form of small glass beads or balls or source made up of bricklike pieces, stacked one above the other, in a holder to form a large sheet. These two versions are shown in FIGs. 1 and 4, respectively. Other forms such as rods, large sheets, ribbons, etc., may also be used, but the preferred form is the glass ball system which lends itself to fluid handling in that the glass beads may be pumped into a suitable lead-lined tank for replacement of source material. The individual source holder is designed so to provide a cooling of the source as well as radiation to the sewage.

Cooling of the system is an important consideration. Fission product wastes are primarily beta emitters, and since beta rays travel very short distances in matter, most of their energy is dissipated in the source element itself. This energy which is dissipated is great (as high as about 0.50 watts per cubic centimeter of source material) and can cause considerable temperature rises in the source. Unless the system is adequately designed, one would obtain boiling and, possibly, volatilization of the source, and in addition the production of very hazardous dispersion of radioactive material. Each of the radiation cells must be designed to have adequate cooling by natural convection within the cell. The design shown in FIG. 1 to 4 forms very efficient convection cells because of the separation of the up and down flows, and also the cells can be made thin so that most of the gamma radiation escapes the cells and is absorbed in the sewage. Thus, the cells are very efficient, leading to low cost of the overall system. Note that with suitable design of the cells, overheating will not occur, even if there is no flow of the sewage.

The radiation source and its coolants are separated from the sewage to reduce the probability of causing contamination the effluent with radioactive material. Even if the source material should crack or break for some reason or another, the water or other fluid medium could be removed from the cell and replaced with a noncontaminated material. On the other hand, if the casing of the cell should leak, the sewage may enter the cell and/or the water or other liquid from the cell may enter the sewage. Unless there had previously been a leak between the source material and the fluid in the radiation cell, there would be no appreciable damage done. In this regard, it should be noted that the source is contained by an insoluble leach-resistant material and the cooling fluid should not contain any radioactive material. In any event, any leak between the cell and the sewage is easily detected by initially having the coolant level different from that of the sewage and then monitoring the level of the column of coolant above the source. If a leak occurs, the coolant level will change.

A further feature of the design provides for a column of water above the radioactive material as high as is necessary to provide adequate shielding of the source material.

The sewage treatment apparatus could be designed in such a way that the cell would be completely enclosed in concrete, ut for ease of handling and at the lowest cost, the sewage would be treated in a long cement-lined tank with the cells parallel to each other in the tank and they would be exposed to the atmosphere or in a covered building; but with a substantial amount of water above the cells that would reduce the radiation hazard.

As mentioned, our preferred technique for employing fission byproduct wastes as a radiation source is to incorporate them into a leach-reisistant glasslike material such as nepheline syenite. As already mentioned, the ultimate source may be in the form of beads, pebbles, bricks, sheets, etc., depending upon other design considerations of the system. While it is preferred to impregnate a solid such as glass, it is possible to use such other materials as ceramics, metal, porcelain, or any one of many different solids. It is essential, however, that the material be leach-resistant to reduce the possibility of removing any radioactive material from the source.

As a specific example, it has been found that a suitable source can be prepared by heating to approximately 1350° C. a mixture of about 50 percent nepheline syenite and about 50 percent calcium hydroxide with a concentrated fission byproduct solution. One kg. of such a material can hold almost 1 litre of concentrated fission waste solution. It has been found that leaching losses from this product are less than $5 \times 10^{18}$ grams of glass per square centimeter of area per day under normal flow rates.

As a further typical example, a material has effectively been employed consisting essentially of 1.87 kg. of nepheline syenite, 0.44 kg. of calcium hydroxide, and 0.2 litres of water, with 2.2 litres of fission byproduct waste which is pelletized and fired in the manner mentioned in the Watson et al. reference mentioned supra.

While the foregoing has been given as a specific example, it is to be understood that numerous other leach-resistant materials may be effectively utilized. A typical mixture of fission byproduct wastes stored for 5 years after removal from the reactor will contain between 30 and 170 curies of activity per litre. Before using this material for the purposes of this invention, it is concentrated by evaporation to an estimated activity of 20,000 to 50,000 curies per litre.

COMPOSITION OF FISSION PRODUCT LIQUOR FIVE YEARS AFTER REMOVAL FROM REACTOR

| Isotope | Percentage of Activity | Half Life $T-1/2$ | Major Decay |
| --- | --- | --- | --- |
| Krypton-85 | 2.02 | 10.3 yr. | Beta |
| Strontium-90 | 18.40 | 27.7 yr. | Beta |
| Yttrium-90 | 18.40 | 64.2 yr. | Beta |
| Ruthenium-106 | 1.04 | 1.0 yr. | Beta |
| Rhodium-106(b) | 1.04 | 30 sec. | Beta |
| Antimony-125(b) | 0.18 | 2.7 yr. | Beta |
| Tellurium-125(b) | 0.18 | 58 days | Gamma |
| Cesium-137 | 14.90 | 33.0 yr. | Beta |
| Barium-137(b) | 14.10 | 2.6 yr. | Gamma |
| Cerium-144 | 4.10 | 285 days | Beta |
| Praseodynium-114(b) | 4.10 | 17 min. | Beta |
| Promethium-147(b) | 20.80 | 2.64 yr. | Beta |
| Samarium-151 | 0.51 | 93.0 yr. | Beta |
| Europium-155 | 0.20 | 1.7 yr. | Beta |

Aged fission byproduct waste should be used since most of the initial short lived radioactivity will be eliminated and cooling of the cell is then less of a problem. The cells will also have a long useful life.

The actual amount of isotopes needed to perform the treatment of sewage depends upon the amount of sterilization and the amount of chemical compound breakdown desired. With a criteria of 100 percent destruction of all synthetic detergents (syndets), 100 percent reduction of the biological oxygen demand (B.O.D.), and 99.99 percent kill of all E. Coli bacteria, we find that approximately $10^{10}$ curies of fission product activity is required to treat 100 million gallons of sewage per day.

In a sewage treatment plant, the most convenient construction is to arrange the cells into rows forming long channels. If the width of the channel is large, the radiation intensity at the center of the channel is weak but all the radiation is adsorbed in the sewage. If the channel is too thin, much of the radiation is adsorbed in the cells and is thus inefficient.

Figure 8:
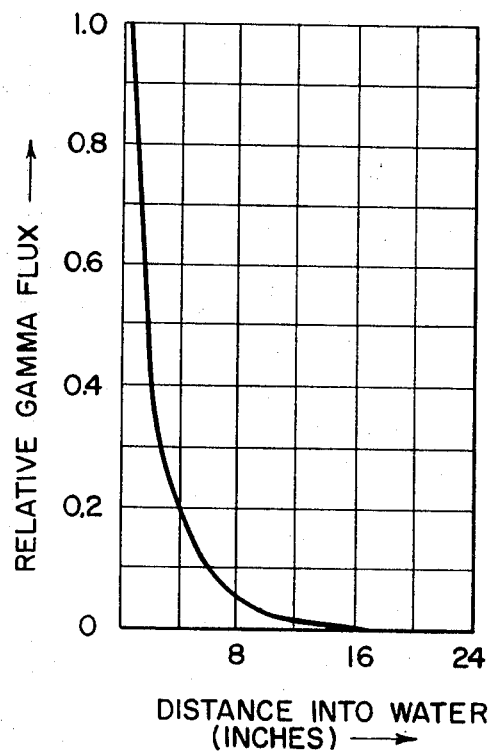
FIG. 8 is a diagram of the relative flux distribution from a uniform plane slab of radiating material showing the manner which the flux distribution exponentially declines with respect to distance from the slab.

FIG. 8 shows the relative radiation intensity from a uniform plane source. It may be seen that for a channel width of 5 inches, at least 90 percent of the radiation emanating from a cell is adsorbed in the sewage. The amount of radioactive material needed is dependent upon the channel width, the source thickness, the amount of material interposed between the source and the sewage channel, the number of channels, the size of channels, the sewage flow rate and the degree of treatment required.

Figure 5:
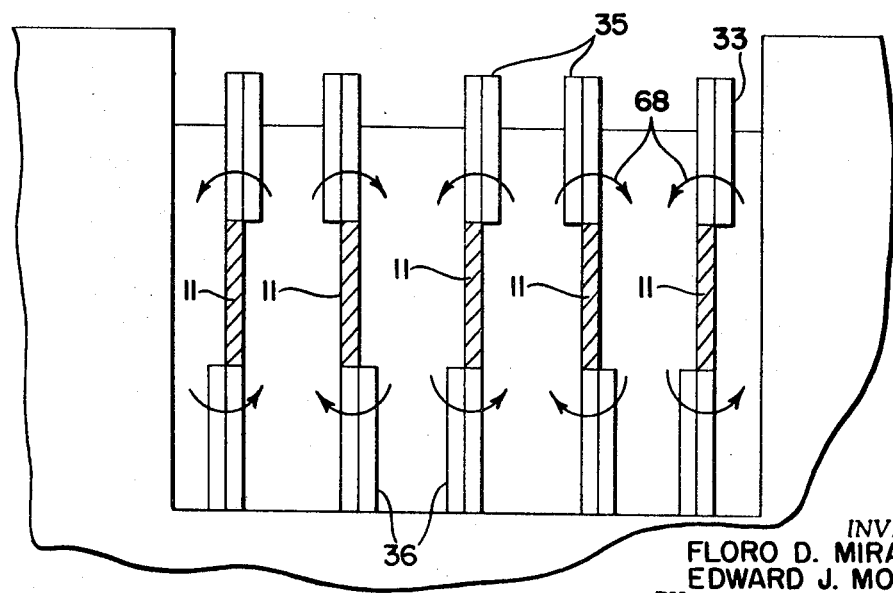
FIG. 5 is a vertical cross-sectional view of a sewage treatment system showing five radiation elements with their associated guide vanes in the flow path of the sewage.
Figure 6:
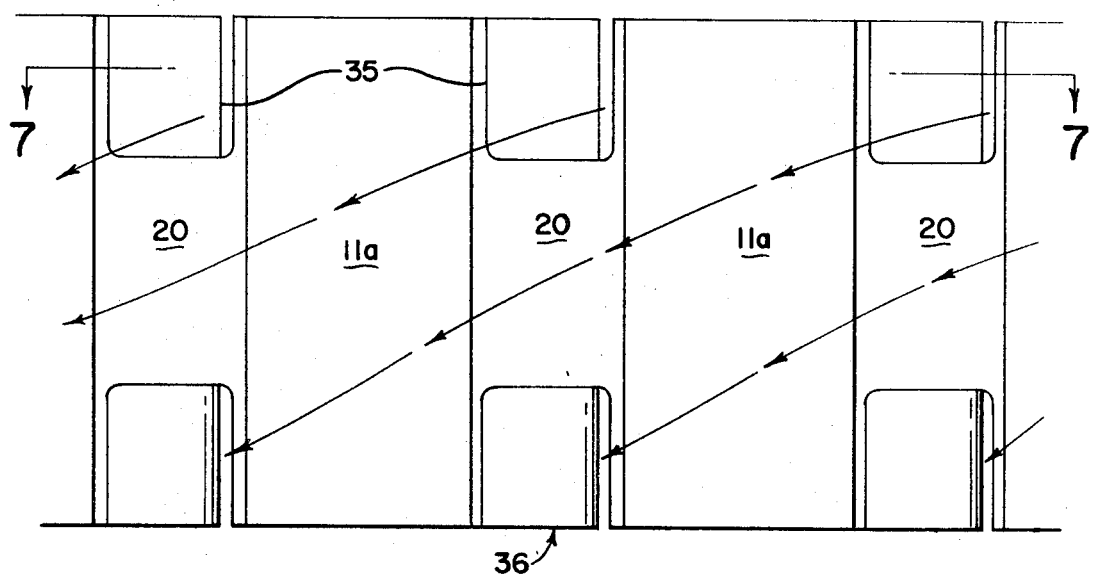
FIG. 6 is a side elevational view of a series of radiation cells of FIG. 1 and 4 along with the guide vanes to provide circulation of the sewage in a helical manner around each row of cells to provide proper mixing of the sewage for substantially uniform irradiation.
Figure 7:
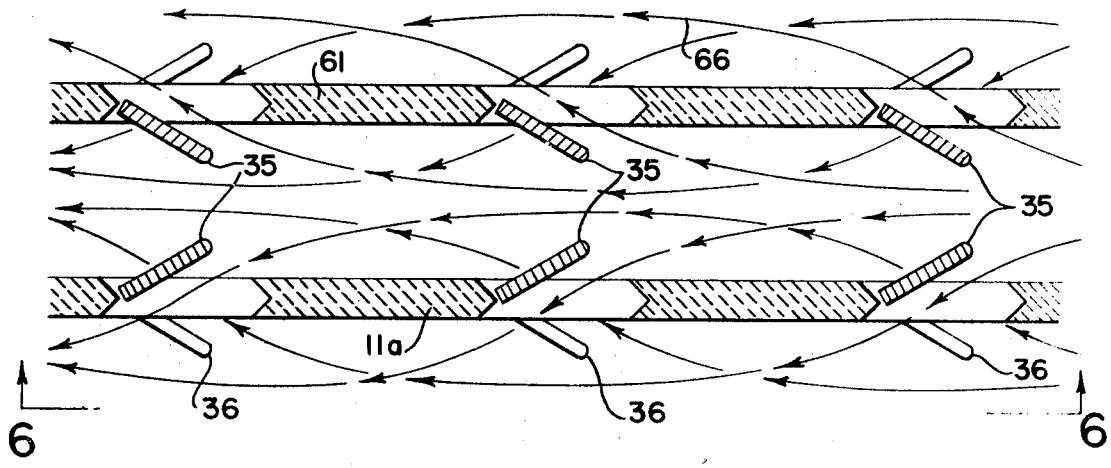
FIG. 7 is a cross-sectional plan view of the radiation cells of FIG. 6.

The foregoing discussions have related primarily to the principles of this invention, the nature of the fission byproduct source, and the construction of an individual cell. Referring more particularly to FIGS. 5-7, there is shown an exemplary system comprising rows of interlocked cells, arranged in a manner to obtain the necessary flow patterns for mixing and uniform irradiation of the sewage without undue pumping losses.

FIG. 5 shows a vertical cross-sectional view of a system comprising five spaced, generally parallel rows of radiation cells with associated guide vanes, 35 and 36, in the flow path of the sewage. The cells, comprising a source and a source holder, are shown at 11.

FIG. 6 is an elevational view of part of a row of cells with the cells depicted as 11a and the associated spacer elements 20 with upper guide vanes 35 and lower guide vanes 36. A number of cells may be inserted between spacer elements. Approximate streamlines are indicated by arrows.

FIG. 7 is a cross-sectional view of the system shown in FIG. 6.

From FIGS. 5, 6 and 7, it is clear that the purpose of the guide vanes is to provide a generally helical flow and mixing around the rows of cells. This type of flow is provided to ensure uniform irradiation of all sewage particles. For efficient operation, some such mixing is necessary since the radiation intensity at different points varies enormously. For example, the radiation intensity at the surface of the sewage is extremely low since the sewage shields the surroundings from the radiation. Thus, surface sewage must be in continual motion towards the source; otherwise, highly nonuniform irradiation of the sewage will result. Various other vane arrangements may be made to accomplish uniform mixing, but the advantage of the one shown in FIGS. 5-7 is that it is simple, effective and has low flow resistance. Note that if the flow in one channel is generally upwards, the flow in adjacent channels is generally downward.

Figure 9:
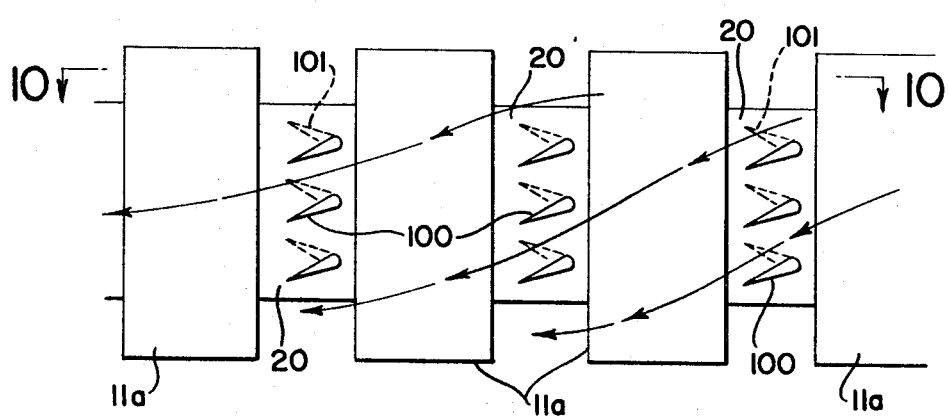
FIG. 9 is a side elevational view of a series of radiation cells of FIG. 1 and 4, along the airfoil type vanes as an alternate method to that shown in FIG. 6 to provide circulation of the sewage in a helical manner around each row of cells to provide mixing of the sewage for substantially uniform irradiation.
Figure 10:
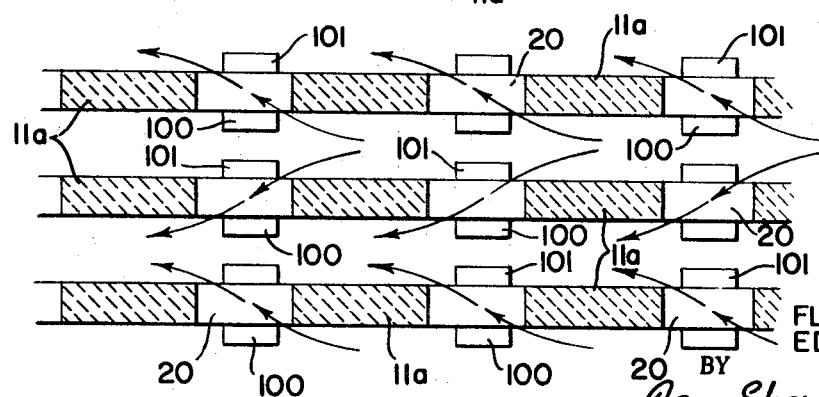
FIG. 10 is a cross-sectional plan view of the radiation cells of FIG. 9.
Figure 11:
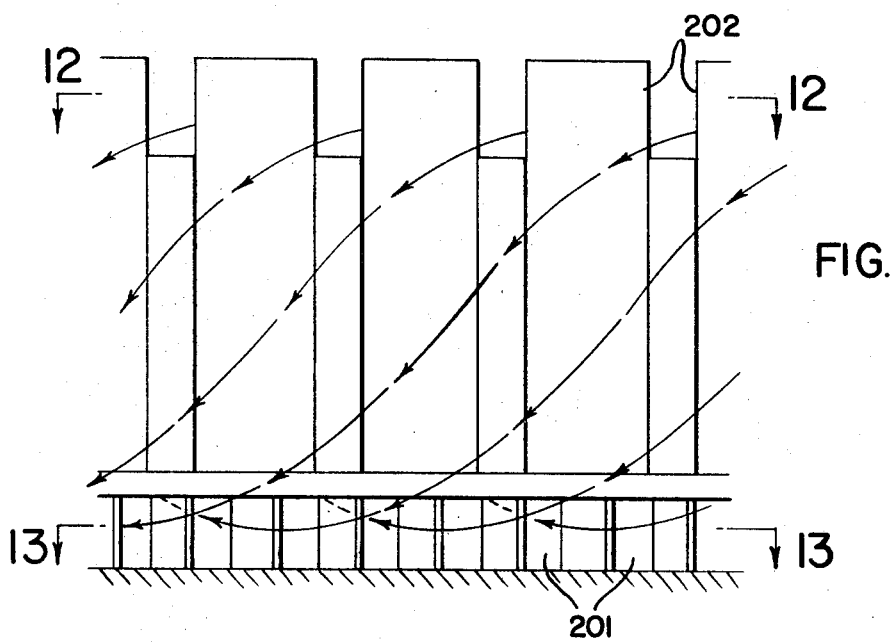
FIG. 11 is a side elevational view of a series of radiation cells of FIG. 1 and 4 along with a guide vane arrangement, which is an alternate to the systems of FIG. 6 or FIG. 9, to provide circulation of the sewage in a helical manner around each row of cells to provide mixing of the sewage for substantially uniform irradiation.
Figure 12:
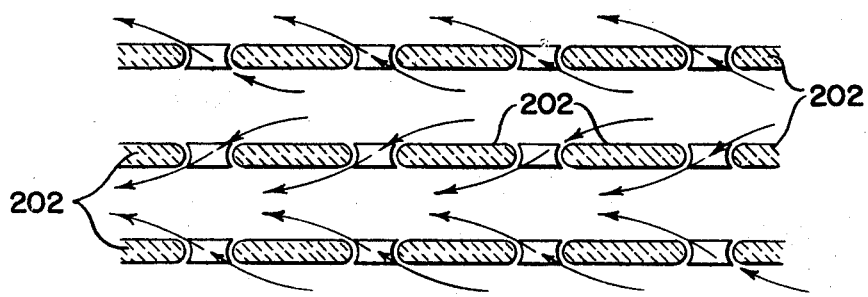
FIG. 12 is a cross-sectional plan view of the system FIG. 11.
Figure 13:
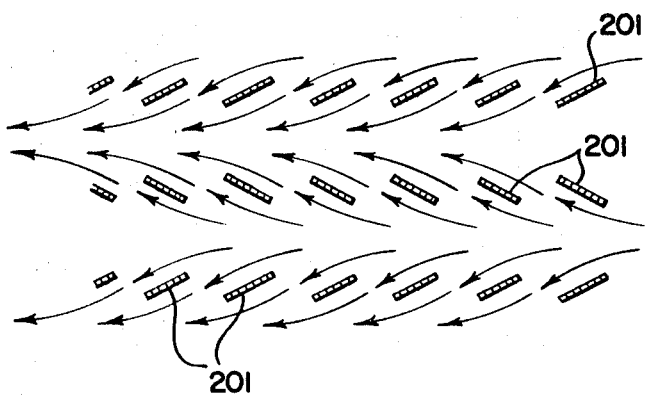
FIG. 13 is a cross-sectional plan view of the guide vane portion of the system of FIG. 11.

The same generally helical flow may be obtained by a variety of methods. An alternative to the guide vanes at the top and bottom of the spacing elements is shown in FIG. 9 and 10 In this case, short airfoil-like blades or vanes project more or less horizontally from the sides of the channels. In FIG. 9, the vanes 100 are shown projecting from FIGS. sides of the spacing elements 20, but they could also project from the sides of the radiation cells 11a. Note that if the vanes on one side of a row are imparting a downward motion on the sewage, as occurs for the vanes 100, then the vanes 101 on the other side of the row should impart an upward motion if the flow is to have a generally helical motion around a row. Thus, vanes on opposite sides of a row have opposite angles of inclination whereas vanes on opposite sides of a channel have the same inclination. This arrangement gives flows in channels which alternate between being generally upward and generally downward, as required for helical flow around the rows. These horizontally projecting vanes may also be used in combination with the top and bottom vanes shown in FIGS. 6 and 7. Another alternative guide vane arrangement is shown in figs. 11, 12 and 13. Here, the cells are separated by vanes (directional) on the bottom at 202 on the top. Alternate rows of vanes on the bottom are faced in opposite directions.

Instead of he parallel rows of cells shown in FIGS. 6, 7, 9 and 10, the radiation cells may be arranged to form spiral channels. The type of guide vanes previously described could be used again. For best results, the spiral channel should be made of two separate spiral rows, one row without any openings so that no sewage could flow through the row, and the other spiral row with openings to circulate the sewage from a channel on one side of the row to the channel on the other side of the row.

As previously stated, the gamma radiation causes suspended particles to agglomerate and settle towards the bottom of the tanks. The channel may be cleaned of deposits very simply, however, by moving one or more pairs of high velocity water jets between the rows of cells. The general flow would carry suspended particles into settling tanks downstream of the irradiation section.

Many apparently widely different embodiments of this invention may be made without departing from the spirit and scope thereof, and it is to be understood that we do not intend to be limited by the specific embodiments disclosed except as defined by the appended claims.

1. A method of treating contaminated water to kill bacteria and degrade chemical compounds, comprising:
   enclosing a gamma radiation source comprising fission product waste;
   passing the source and the contaminated water with respect to each other to expose the water to the radiation in order to sterilize and kill bacteria in the water;
   the fission product waste being encapsulated in a leach-resistant glass or ceramic product to form a radiation source, the radiation source being substantially below the level of he contaminated water so that adequate shielding is provided.

2. The method of claim 1 in which the gamma radiation is substantially that of the cesium-barium isotope.

3. The method of claim 1 in which the fission product waste is held in a container with coolant.

4. The method of claim 3 in which the source and the container form a natural convection cell.

5. The method of claim 4 in which the up and down flows of the convection current are essentially separated by the construction of the container.

6. The method of claim 3 in which the containers are arranged in channels and the sewage or contaminated water flows along the channels.

7. The method of claim 1 in which the radiation source is in the form of beads or balls.

8. The method of claim 1 in which the radiation source is in the form of bricks.

9. A method or the radiation treatment of sewage to kill a high proportion of the Escherichia Coli bacteria present and degrade chemical compounds, comprising:
   providing a plurality of gamma radiation sources in spaced relationship with channels therebetween and substantially parallel to each other in the direction of the sewage flow;
   providing a flow-diverting means to divert the sewage to an adjoining channel whereby a portion of the sewage is diverted to an adjacent channel thereby to enhance thorough mixing so that equal dosages of gamma radiation will radiate throughout the sewage to kill the Escherichia Coli bacteria therein.

10. A method for the radiation treatment of sewage to kill a high proportion of the Escherichia Coli bacteria present and degrade chemical compounds, comprising:
   providing a plurality of gamma radiation sources in spaced relationship with channels therebetween and substantially parallel to each other in the direction of the sewage flow;
   providing a flow-diverting means associated with said radiation source to divert sewage downwardly in one channel and upwardly in an adjacent channel thereby producing a helical flow of contaminated water around the source.

11. A radiation cell, comprising:
   a source of gamma radiation impregnated in a leach-resistant ceramiclike material;
   a holder for said source having a low attenuation to gamma radiation;
   a low attenuation cooling fluid surrounding said radiation source on all sides; and
   a liquid-impervious enclosure for said radiation source, holder, and fluid providing for low attenuation of gamma radiation.

12. The radiation cell of claim 11 in which the source holder has openings above and below the source and a channel providing fluid communication from the upper to the lower portions of said cell whereby natural convection currents of warmed fluid will rise in said source holder and pass outwardly through the openings above the source into the channel and then downwardly in a circulatory manner.

13. A sewage treatment apparatus for exposing bacterial and chemical compound-contaminated sewage to irradiation, comprising:
   a tank for containing the sewage and having inlet and outlet means;
   a plurality of spaced substantially parallel radiation cells in said tank forming channels therebetween;
   each of said cells having its radiation source substantially below the upper level of sewage in the tank;
   a series of impervious baffles extending between the source members and from a point below the upper level of the radiation cells to a point above the bottom of the tank; a plurality of angled vanes at the bottom of the tank beneath the radiation cells, said vanes being formed in rows and alternating with respect to each other whereby a flow of contaminated sewage in the tank flows from one channel over the baffles at the top of the tank and flows downwardly to the vanes at the bottom of the tank to adjacent channels in a helical pattern whereby the vanes at the bottom create a pressure differential in the channel where the vanes at the bottom are angled toward one another in the direction of flow, resulting in a higher pressure, consequently sewage will flow at the top of that same channel to adjacent channels because of the pressure differential.

14. A sewage treatment apparatus for exposing bacterial and chemical compound-contaminated sewage to irradiation, comprising:
   a tank for containing the sewage and having inlet and outlet means;
   a plurality of spaced substantially parallel radiation cells in said tank forming channels therebetween;
   each of said cells having its radiation source substantially below the upper level of sewage in the tank;
   a series of at least one upper and one lower vane means disposed between said radiation cells and projecting at an incline into the channels defined thereby, said vane means comprising flow restrictors and openings between the rows of cells whereby the flow of sewage along substantially parallel paths will be restricted and will pass to an adjacent channel to provide substantially equal radiation treatment to the sewage in the tank;
   an opening adjacent to each vane providing fluid communication between the channel into which the vane projects and the channel adjacent thereto;
   each vane of a given series being inclined in the same direction;
   the vanes of the said one series being divergent with respect to the vane of the other series and vanes of one series being vertically disposed with respect to the vanes of the other series, whereby approaching sewage will be diverted from the channel into which the vane projects through said opening into the channel adjacent thereto and then in a direction which includes a vertical component, in a generally helical manner.